(12) United States Patent
Eyal et al.

(10) Patent No.: US 8,694,372 B2
(45) Date of Patent: Apr. 8, 2014

(54) SYSTEMS AND METHODS FOR AUTOMATIC CONTROL OF MARKETING ACTIONS

(75) Inventors: Adi Eyal, Tel Aviv (IL); Tal Reichert, Boston, MA (US)

(73) Assignee: Odysii Technologies Ltd, Herzeliya (IL)

( * ) Notice: Subject to any disclaimer, the term of this patent is extended or adjusted under 35 U.S.C. 154(b) by 1429 days.

(21) Appl. No.: 11/314,713

(22) Filed: Dec. 21, 2005

(65) Prior Publication Data
US 2007/0143179 A1 Jun. 21, 2007

(51) Int. Cl.
*G06Q 30/00* (2012.01)

(52) U.S. Cl.
USPC .................................................. 705/14.41

(58) Field of Classification Search
None
See application file for complete search history.

(56) References Cited

U.S. PATENT DOCUMENTS

| | | | | |
|---|---|---|---|---|
| 6,233,564 | B1 | 5/2001 | Schulze, Jr. | 705/14 |
| 6,292,786 | B1* | 9/2001 | Deaton et al. | 705/14 |
| 2002/0046128 | A1* | 4/2002 | Abe et al. | 705/26 |
| 2002/0116348 | A1* | 8/2002 | Phillips et al. | 705/400 |
| 2003/0115090 | A1 | 6/2003 | Mujtaba et al. | 705/8 |
| 2003/0149610 | A1 | 8/2003 | Rowan et al. | 705/10 |
| 2004/0024715 | A1* | 2/2004 | Ouimet | 705/400 |
| 2004/0030597 | A1* | 2/2004 | Bibas | 705/14 |
| 2005/0039206 | A1 | 2/2005 | Opdycke | 725/35 |
| 2005/0267803 | A1* | 12/2005 | Patel et al. | 705/14 |
| 2007/0112618 | A1* | 5/2007 | Krneta | 705/10 |

OTHER PUBLICATIONS

International Search Report for PCT/US06/48324, mailed Jan. 8, 2008.

* cited by examiner

*Primary Examiner* — Daniel Sorkowitz
(74) *Attorney, Agent, or Firm* — Hunter Clark PLLC

(57) ABSTRACT

A method for automatically performing marketing actions. The method includes receiving consumer input relating to a product and/or service ("Product/Service") from a service information display, receiving contextual input associated with the consumer input, placing the received consumer and contextual input into one or more segmented data groups, wherein each segmented group includes consumers data and associated contextual data having similar characteristics, and wherein each segmented group has sufficient consumers data and associated contextual data to enable statistical analysis. The method further includes computing for the Product/Service a projected marketing effectiveness corresponding to a change to one or more marketing attributes of the Product/Service, where the change to one or more marketing attributes defines a marketing action specified in a rule associated with one of the one or more segmented groups, and applying the rule in response to the projected effectiveness being equal or exceeding a corresponding pre-defined value.

38 Claims, 9 Drawing Sheets

FIG. 3

| PRODUCT/SERVICE IDENTITY 302 | CATEGORY 304 | DESCRIPTION 306 | TIME 312 | OUTLET IDENTITY 314 | POS IDENTITY 316 |
|---|---|---|---|---|---|

CONTEXTUAL INFORMATION 310

FIG. 4A

| PRODUCT/SERVICE IDENTITY 402 | OUTLET IDENTITY 404 | INVENTORY LEVEL 406 |
|---|---|---|

FIG. 4B (410)

| PRODUCT/SERVICE IDENTITY 412 | OUTLET IDENTITY 414 | SALES STATUS 416 | PRICE 418 | CUSTOMER IDENTITY 419 |
|---|---|---|---|---|

FIG. 4C (420)

| PRODUCT/SERVICE IDENTITY 422 | OUTLET IDENTITY 424 | PRICE 426 |
|---|---|---|

430 ⤴

| PRODUCT/ SERVICE IDENTITY 432 | SUPPLIER NAME 434 | QUANTITY LEVEL 436 | ORDER STATUS 438 | PRICE 439 |

| PRODUCT/ SERVICE IDENTITY 442 | CATEGORY 444 | PRODUCT/ SERVICE DESCRIPTION 446 | OUTLET IDENTITY 448 | PRICE 450 | STATUS 452 | INVENTORY LEVEL 454 | CUSTOMER IDENTITY 456 | SUPPLIER NAME 458 |

| QUANTITY LEVEL 460 | ORDER STATUS 462 | TIME 464 | ORIGIN 466 |

FIG. 4E

SYSTEMS AND METHODS FOR AUTOMATIC CONTROL OF MARKETING ACTIONS

TECHNICAL FIELD

This invention relates to marketing, and more particularly to automatic control of marketing actions.

BACKGROUND

Many retailers operating out of physical outlets are increasingly relying on the use of electronic user interfaces as a way of providing information to consumers regarding their services and/or products, and as a way of interacting and transacting with consumers. For example, retailers use information display devices to display static information (e.g., an announcement of a week-long sale), changing information (e.g., a running list of specific products that are on-sale), and video clips (e.g., advertisements for particular products or services). Such display devices, sometimes referred to as digital signage devices, may come in the form of television monitors, electronic bulletin-boards, etc.

Retailers are also increasingly using electronic user interfaces with their information display device to efficiently assist consumers to find information about a product or service without requiring the help of the outlet's personnel. For example, some retail outlets, such as book stores, provide information display devices that enable the customers to determine if a particular title is available at that outlet, or at another outlet.

A common problem experienced by retailers is the retailers' slow response to changing marketing conditions (e.g., changes to consumers' behavior and needs). For example, a retailer may not be able to adjust inventory levels at an outlet quickly enough in response to an increase in the demand for a particular product. Similarly, retailers cannot efficiently adjust their pricing for various products and services in accordance with fluctuating consumers demands.

While retailers have been successful in using information display devices to present information to consumers, retailers have not used such devices to more profoundly facilitate the retailers' marketing operations by enabling those retailers to more quickly and efficiently respond to changing marketing conditions.

SUMMARY

In one aspect, the invention includes a method for automatically performing marketing actions. The method includes receiving consumer input relating to a product and/or service ("Product/Service") from a service information display located at an outlet, receiving contextual input associated with the consumer input, placing the received consumer input and associated contextual input into one or more segmented data groups, wherein each segmented group includes consumers data and associated contextual data having similar characteristics, and wherein each segmented group has sufficient consumers data and associated contextual data to enable statistical analysis. The method further includes computing for the Product/Service a projected marketing effectiveness corresponding to a change to one or more marketing attributes associated with the Product/Service, where the change to one or more marketing attributes defines a marketing action specified in a rule associated with one of the one or more segmented groups, and applying the rule that performs the marketing action in response to the projected effectiveness being equal or exceeding a corresponding pre-defined value.

In some embodiments the contextual input includes, for example, geographical location of the outlet, location of the information display within the outlet, and/or time at which input was received.

In some embodiments the method further includes receiving data corresponding to, for example, consumer behavior and trends, sales volume, inventory levels, and/or external conditions.

In some embodiments the marketing attributes include, for example, price, package deal, in-store advertisement, out-or-store advertisement, and/or inventory level.

In some embodiments computing the projected effectiveness includes determining whether the change to the one or more marketing attributes associated with the Product/Service will result in a level of change of a corresponding marketing-related performance parameter for that Product/Service that exceeds the corresponding pre-defined value. In some embodiments the corresponding marketing-related performance parameter includes, for example, increased sales, and/or increased marketing interest.

In some embodiments computing the projected effectiveness is based on historical data that relates past changes of marketing attributes of products and/or services to corresponding resultant changes to historical marketing-related performance parameters for those products and/or services.

In some embodiments computing the projected effectiveness is performed using a machine-learning technique. In some embodiments the machine learning technique includes, for example, support vector technique, neural network technique, technique based on decision trees, and/or a regression technique.

In some embodiments placing the received consumer input and associated contextual input into one or more segmented data groups includes computing a metric representative of the consumer input and associated contextual input, performing a comparison of the metric to the respective metrics of available segmented data groups, and placing the consumer input and associated contextual input into the one or more segmented data groups based on the comparison.

In some embodiments applying the rule that performs the action includes causing the change to the one or more marketing attributes associated with the Product/Service.

In some embodiments the service information display includes, for example, a touch screen, an informational kiosk, and/or a PDA.

In another aspect, the invention includes a system that automatically performs marketing actions. The system includes a service information display located at an outlet configured to receive consumer input regarding a product and/or service ("Product/Service"), communication interface configured to receive from the service information display the consumer input and contextual input associated with the consumer input, a storage segmented into data groups that maintain consumers data and associated contextual data having similar characteristics, each of the segmented data groups includes sufficient consumers data and associated contextual data to enable statistical analysis. The system further includes a processing module configured to place the consumer input and associated contextual data into one or more of the segmented groups, and compute for the Product/Service a projected marketing effectiveness corresponding to a change of one or more marketing attributes associated with the Product/Service, where the change to the one or more marketing attributes defines a marketing action specified in a rule associated with one of the one or more segmented groups. The system additionally includes a rule engine configured to apply the rule that performs the marketing action in response to the projected effectiveness being equal to or exceeding a corresponding pre-defined value.

In another aspect, the invention includes a computer program product residing on a computer readable medium and comprising computer instructions that when executed on a processor-based device cause the processor-based device to receive consumer input relating to a product and/or service ("Product/Service") from a service information display located at an outlet, receive contextual input associated with the consumer input, place the received consumer input and associated contextual input into one or more segmented data groups, wherein each segmented group includes consumers data and associated contextual data having similar characteristics, and wherein each segmented group has sufficient consumers data and associated contextual data to enable statistical analysis. The computer instructions further cause the processor-based device to compute for the Product/Service a projected marketing effectiveness corresponding to a change to one or more marketing attributes associated with the Product/Service, where the change to one or more marketing attributes defines a marketing action specified in a rule associated with one of the one or more segmented groups, and apply the rule that performs the marketing action in response to the projected effectiveness being equal or exceeding a corresponding pre-defined value.

In another aspect, the invention includes a method for automatically performing marketing actions. The method includes receiving consumer input relating to one or more products and/or services ("Products/Services") from a service information display located at an outlet, receiving contextual input associated with the consumer input, placing the received consumer input and associated contextual input into one or more segmented data groups, wherein each segmented group includes consumers data and associated contextual data having similar characteristics, and wherein each segmented group has sufficient consumers data and associated contextual data to enable statistical analysis. The method further includes computing for at least one of the Products/Services a corresponding projected marketing effectiveness corresponding to a change to one or more marketing attributes associated with the at least one of the Products/Services, where the change to one or more marketing attributes defines one or more marketing actions specified in one or more rules associated with some of the one or more segmented groups, and applying the one or more rules that perform the one or more marketing actions in response to the corresponding projected effectiveness being equal or exceeding a corresponding pre-defined value.

The details of one or more embodiments of the invention are set forth in the accompanying drawings and the description below. Other features, objects, and advantages of the invention will be apparent from the description and drawings, and from the claims.

DESCRIPTION OF THE DRAWINGS

FIG. 3 is a diagram of an exemplary embodiment of a data structure for storing information collected by the POS devices shown in FIG. 1.

FIG. 4A is a diagram of an exemplary embodiment of a data structure for storing inventory information maintained by the inventory management system shown in FIG. 1.

FIG. 4B is a diagram of an exemplary embodiment of a data structure for storing order and customer information.

FIG. 4C is a diagram of an exemplary embodiment of a data structure for storing pricing information.

FIG. 4D is a diagram of an exemplary embodiment of a data structure for storing supplier information.

FIG. 4E is a diagram of an exemplary embodiment of a data structure for storing the data held in the various types of records received by the central repository shown in FIG. 1.

Like reference symbols in the various drawings indicate like elements.

DETAILED DESCRIPTION

Disclosed herein are systems and methods for using consumer data regarding products and or services, collected from service information displays located in retail outlets and from a retailer's data systems, to determine marketing actions. The collected data is processed by a marketing intelligence system that includes a segmentation server. The segmentation server places the data into one or more segmented groups. The marketing intelligence system also includes a rule engine that applies defined rules, specifying possible marketing actions, and computes, using a learning machine, a projected marketing effectiveness of performing the specified marketing action on one or more of the products/services in a particular group. If the projected effectiveness exceeds a corresponding pre-determined threshold, the marketing action is performed on the retailer's corresponding products and/or services.

Overview

Figure 1:
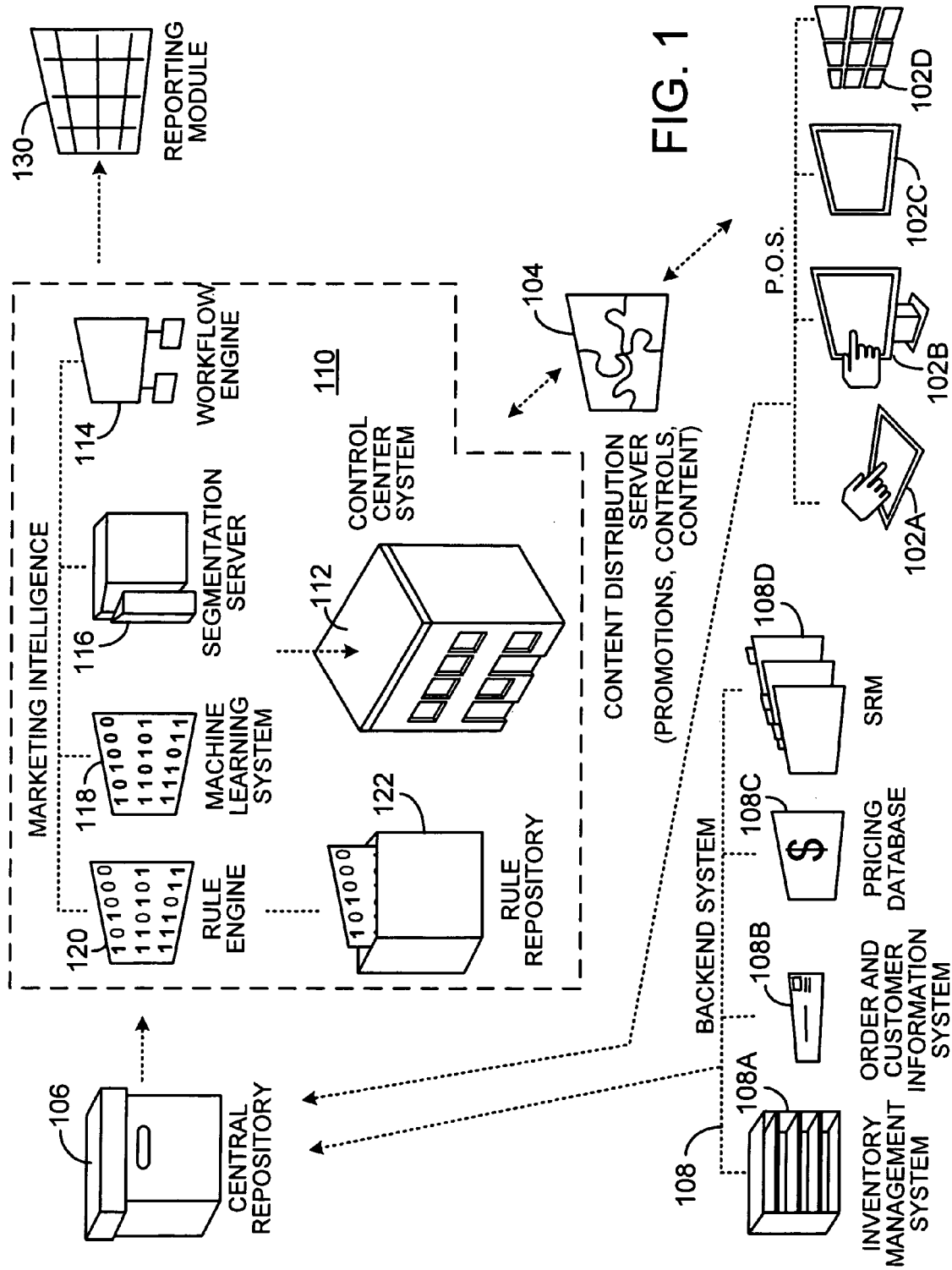
FIG. 1 is a schematic diagram of an exemplary embodiment of a system for automatically controlling marketing actions.

FIG. 1 is a schematic diagram of an exemplary embodiment of a system 100 for automatically controlling marketing actions based on marketing conditions, such as fluctuating consumers' behavior. As shown, the system 100 includes one or more Point-of-Sale ("POS") devices 102*a-d*. As will become apparent below, the POS devices 102*a-d* are electronic service display devices configured to present information to consumers, and/or store personnel, and collect information regarding the consumers' interests and actions with respect to the products/services presented on the POS devices 102*a-d*. The POS devices 102*a-d* receive the content that they present to consumers from the content distribution server 104.

Information collected by the POS devices 102*a-d* is sent to a central repository 106, where information from various POS devices, corresponding to one or more entities (e.g., different retail chains) are stored. The central repository 106 also receives information from the backend systems of the various entities operating the POS devices. Backend information systems 108*a-d* (operated by a particular entity) supplements the information collected by the POS devices with additional business data, such as the entity's inventory levels at its various outlets, sales transactions, pricing information for the entity's various products and/or services, etc.

As will be described in more detail below, the data collected by the central repository 106 is then processed by a marketing intelligence system 110. The marketing intelligence system includes a workflow engine 114 which controls the operations executing on the various modules of the marketing intelligence system 110. The marketing intelligence system 110 includes a segmentation server 116 which retrieves records from the central repository 106 and places those records into segmented groups. The marketing intelligence system 110 also includes the rule engine 120 which applies rules, specifying marketing actions, based on a determination by a machine learning system 118 of whether the projected effectiveness that would result from the execution of those marketing actions would exceed a performance threshold. If the projected effectiveness matches or exceeds such a pre-defined threshold, the marketing actions defined in the rules are implemented on the various systems of system 100 affected by the marketing actions (e.g., one or more POS device, one or more of the backend systems, etc.) The marketing actions thus adjust the marketing attributes of the affected products and services. Information produced by the marketing intelligence system 110 is also sent to the reporting module 130. User control of the marketing intelligence system 110 is achieved using the control center system 112.

Each of the various systems and devices shown in FIG. 1 is a processor-based device that includes a computer and/or other types of processor-based devices suitable for multiple applications. Such devices can include volatile and non-volatile memory elements, and peripheral devices to enable input/output functionality. Such peripheral devices include, for example, a CD-ROM drive and/or floppy drive, or a network connection, for downloading related content to the connected system. Such peripheral devices may also be used for downloading software containing computer instructions to enable general operation of the respective system/device, and for downloading software implemented programs to perform operations in the manner that will be described in more detailed below with respect to the various systems and devices shown in FIG. 1.

Further, the various systems and devices comprising system 100 are connected using conventional network arrangements. For example, the various systems and devices of system 100 may constitute part of a private packet-based network. Other types of network communication protocols may also be used to communicate between the various systems and devices. Alternatively, the systems and devices may each be connected to network gateways that enable communication via a public network such as the Internet. Each of the systems and devices of system 100 may, under those circumstances, include security features, such as a firewall, VPN and/or authentication applications, to ensure secured communication. Network communication links between the systems and devices of system 100 may be implemented using wireless or wire-based links. Further, dedicated physical communication links, such as communication trunks may be used. Some of the various systems described herein may be housed on a single processor-based device (e.g., a server) configured to simultaneously execute several applications.

POS Devices

With reference to FIG. 1, each of the POS device 102a-d is configured to display electronic content to consumers visiting a retail outlet. Additionally, at least some of the POS devices 102a-d are configured to enable consumer interaction with a user interface integrated into those POS devices. As can be seen from FIG. 1, POS devices 102a-b are touch screen devices having sensitive display surfaces that receive input from a consumer touching the screen at various locations. For example, displayed on the screen of POS devices 102a-b could be icons or product names. Other POS devices configured to enable user interaction therewith include computer consoles having keyboards, or other types of user input devices such as a mouse, a stylus pen, a light pen, etc.

In response to a user selection, the POS device with which the user is interacting retrieves from content distribution server 104, connected to the POS device, additional information pertaining to the selection. Content distribution server 104 stores, among other things, text messages, video clips, and icons pertaining to the products and services with respect to which the consumer can obtain information.

POS devices can also includes devices 102c-d that enable display of electronic content, but are not necessarily configured to enable user interaction. Such devices may include flat screen monitors (e.g., 102c), televisions sets arranged in a matrix configuration (102d), and other types of the display devices. Content displayed on such non-interactive devices can be selected automatically or manually from the content distribution server 104. When content is sent to the POS devices automatically, the content is selected using, for example, a software-based program, or script, executing on the content distribution server 104, that controls the transfer of content and data from the content distribution server 104 to the POS devices 102a-d.

Additionally, as will become apparent below, the content presented on the POS devices 102a-d is also controlled through commands issued by the marketing intelligence system 110. Those commands are generated in response to the execution of marketing actions associated with rules applied by the rule engine 120, and are sent to the content distribution server 104 to direct it to transmit selected content to the POS devices. Alternatively, the commands may be sent to the POS devices which can then respond to the commands by requesting selected content from the content distribution server 104.

The POS devices 102a-d need not be connected to content distribution server 104, but instead one or more of the POS devices 102a-d can present content stored on a storage module of the POS device. Such a storage module may include volatile and non-volatile memory, CD-ROM, portable storage media such as CD and DVD placed in corresponding reading devices, flash memory devices, and other types of storage devices.

Figure 2:
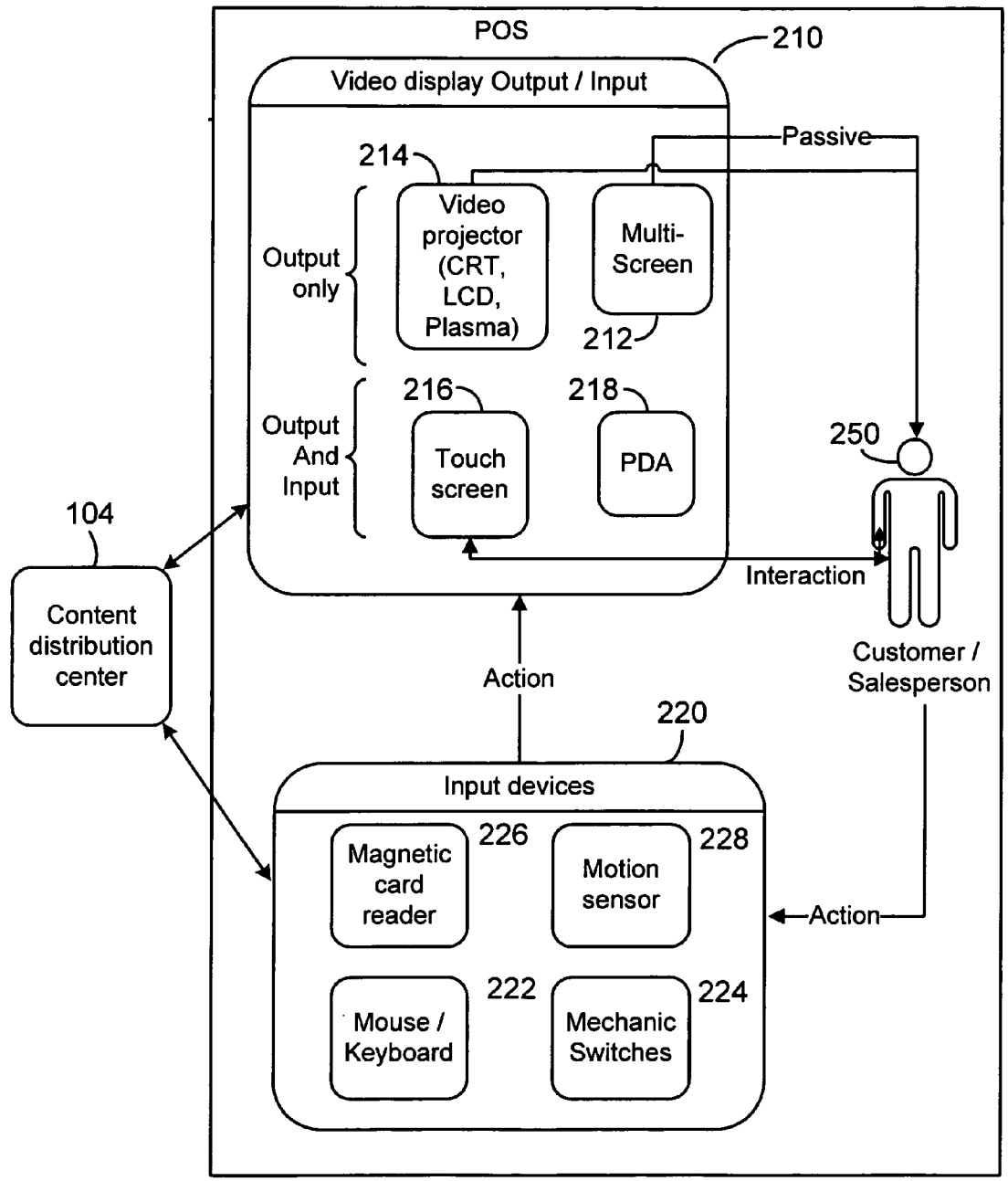
FIG. 2 is a schematic diagram of an exemplary embodiment of a generic POS device.

FIG. 2 is a schematic diagram of an exemplary generic embodiment of a POS device 200, similar to any one of the POS devices 102a-d shown in FIG. 1, that enables consumers' interaction with the device.

As shown, the POS device 200 includes the video display output/input unit 210. The video display unit 210 can include one or more of display devices such as a multi-screen device 212, and/or a video projector 214. Examples of suitable video projector devices that the video display unit 210 may use include cathode-ray-tube based devices, liquid crystal display type devices, and/or plasma type display device. Other types of devices may be used.

Alternatively and/or additionally, the video display unit 210 can include devices whose display surface is configured to receive input from a user 250 (such as a customer or a salesperson) interacting with the POS device 200. Thus, in some embodiments the video display unit 210 may include a touch screen device 216 (such as the screen device used by POS devices 102a-b) having a touch sensitive surface to enable user to enter data and/or make selections by directly touching areas of the screen as directed by graphical prompts appearing on the screen. In some embodiments the video display unit 210 may include a personal digital assistance (PDA) device 218. For such embodiments a user may interact with the POS device 200 using a stylus pen to make selections and/or enter data by pressing specific areas of the screen of the PDA device 218.

As further shown in FIG. 2, the POS device also includes input device unit 220. The input device unit includes one or more of input devices to enable the user 250 to enter data and make selections in a variety of ways. Thus, for example, the input device unit 220 may include a mouse/keyboard device 222, and/or mechanical switches unit 224. The input device unit may also employ information gathering devices that do not require the user to directly respond to prompts or content displayed on the video display unit 210. For example, the input device 220 may include a magnetic card reader 226. A user wishing to view content on the POS device 200 would be required to swipe a magnetic card (e.g., a credit card). Although the POS device would not necessarily request the user to otherwise enter input to control the displayed content, the content on the POS device 200 may nevertheless be influence by the information read from the swiped magnetic card. For example, information on the magnetic card may identify a user, and thus enable the content distribution center 104 to access information about the user from some external or internal database system. The information may indicate demographic information associated with the user (e.g., gender, age, etc.), and thus enable the content distribution center 104 to send content to the POS device 200 that may be of interest to that particular user.

The input device unit 220 may also include a motion sensor 228. Such a motion sensor is configured to detect the presence of a user in the vicinity of the POS device 200, and thereby cause the POS device to begin displaying content on the video display unit 210.

The input device unit 220 may include other types of data entry and/or data collection devices.

As noted above, input collected by the various devices through which the user interacts with the POS device 200 are sent to the content distribution 104 and cause it to send content to the POS device 200 in accordance with the collected input. In addition, as will be described in more details below, the data collected by the input devices of the POS device 200 (or any of the POS devices 102*a-d* shown in FIG. 1) is sent to the central repository 106, and thereafter is processed by the marketing intelligence system 110 to determine suitable marketing actions. The data thus collected through the POS devices affects the marketing actions in the retail outlets in which these POS devices are deployed.

Turning back to FIG. 1, the one or more POS devices 102*a-d* shown in FIG. 1 are situated at various locations within the outlet in which they are deployed. For example, of the POS devices used in a particular outlet, some POS devices may be stationed in one area of the outlet selling a particular line of products (e.g., apparel products), while other POS devices may be located at the area of the outlet in which appliances are sold. Accordingly, content delivered and presented by the various POS devices may depend on the location within the outlet in which the respective POS device(s) is located. As will become apparent below, the system 100 is capable of uniquely controlling marketing actions (e.g., adjusting pricing of merchandise in an area of an outlet, spontaneously initiating a sales event, etc.) corresponding to particular products/services sold or offered at various areas of an outlet based on input from consumers collected through the POS devices deployed at those areas of the outlet.

As noted, in addition to presenting content to consumers, the POS devices 102*a-d*, are also configured to collect input from the consumers. The collected input is subsequently processed to generate useful information that is used to determine marketing actions in real-time or near real-time, by adjusting marketing attributes corresponding to one or more products and/or services. Such marketing attributes include price, package deal offerings, in-store advertisement, out-of-store advertisement, and inventory level corresponding to the various products and services in respect to which the POS devices 102*a-d* present content.

Information collected by POS devices such as POS devices 102*a-d* are first stored on the storage (e.g., volatile and non-volatile memory) of the POS devices. Alternatively, in some embodiments, information collected by a POS device may be transmitted directly to the central repository 106, or some other interconnected server capable of storing data, without being temporarily stored on that POS device.

FIG. 3 is an illustration of an exemplary data structure 300 of a data record in which information received and collected by the POS devices 102*a-d*, and/or a device such as POS device 200, can be stored. As shown, data structure 300 includes a product/service identity field 302 that identifies the type of the product or service with respect to which a consumer sought information. A retail outlet in which POS devices are deployed could assign unique identity codes (which may, for example, correspond to the conventional Uniform Product Code standard) to each of the products it has in its inventory, or services that it offers. A POS device also stores, in a category field 304, a class or category designation of the product or service. These category assignments may be subsequently used to facilitate assignment of the corresponding products/services belonging to certain categories into the groups that are processed using the marketing intelligence system 110 described below. For example, types of categories values or descriptors that can be used to populate category field 304 may include clothing products, cosmetics, electronics, etc.

Optionally, a description field 306 of data structure 300 may store a product description of the product or service identified in field 302. Additionally, if the POS device enables consumers to complete a purchase or return a product, another field in data structure 300 would store information relating to the completed transaction. Other fields may provide additional information regarding the product/service identified in field 302.

As further seen in FIG. 3, data structure 300 includes fields that comprise the contextual information 310 associated with the product/service identified in field 302. The contextual information corresponds to the data that describes where, when, and how information about the product/service was accessed by a consumer. The contextual information facilitates the determination of an action that is to be performed in response to the consumers' real-time behavior as indicated, among other things, by the contextual information.

Thus, contextual information 310 includes a time field 312 that stores the time at which information about the product/service identified in field 302 was accessed or presented to the consumer(s). Contextual information 310 also includes an outlet identity field 314, which identifies the name and/or location of the retail outlet where the POS device used to access the information is deployed. The data type of the outlet identity field could be a numerical code that uniquely identifies the geographic location of the outlet corresponding to the code, or it could be some alphanumerical descriptor (e.g., street address and municipality) that identifies the outlet. Another contextual information field is POS identity field 316, which stores information regarding the specific location of the deployed POS device in the outlet. For example, in a large department-store outlet, several POS devices, such as POS devices 102a-d, may be deployed throughout the outlet, and collect information relating to different products/services sold or offered by the outlet. POS identity field 316 thus identifies which particular POS device collected that information.

Although not shown in FIG. 3, data structure 300 may optionally include a field describing how the information regarding the product/service identified by the field 302 was accessed or obtained. For example, the information stored in such a field could indicate whether the information was obtained through a search query entered by the user through the user interface connected to the POS device. In other circumstances this optional field may indicate that the information regarding the product/service identified by the field 302 was obtained by selecting the product/service from a list of icons or names on the display device of the POS (i.e., the inquiry made by the consumer was more passive in nature). Yet in other circumstances this field could indicate whether any consumer viewed the presentation associated with the products/services identified in field 302. In those circumstances, the POS device would include a sensor to detect the presence of consumers in the vicinity of the POS device (such a sensor could be used with POS devices otherwise lacking a user interface). Thus, the information stored in this type of optional field may be indicative of the level of interest shown by consumers with respect to the corresponding product/service, and thus may provide useful information to enable the determination of appropriate marketing actions to be performed.

Contextual information 310 may also optionally include a field that identifies the consumer who sought the information relating to the product/service identified in field 302. That information may be obtained from the consumer typing in his name, or some identifying code. Alternatively, the consumer's identity may be obtained by optically or magnetically scanning a consumer's identification card using a scanning device (such as the magnetic card reader 226 shown in FIG. 2) connected to the respective POS device the consumer had accessed.

Other fields for storing additional information may be added to data structure 300. Further, information collected by the POS devices 102a-d may be arranged and stored using data structures other than exemplary data structure 300 shown in FIG. 3. Alternatively, the information collected from the POS 102a-d may be stored and managed using databases, including commercial database application such as DB2™ and Oracle™.

Backend System

As can be seen in FIG. 1, data is also collected, and subsequently sent to central repository 106, by backend system 108. A party, for example, the owner of a retail outlet, may wish to augment the data collected through the POS devices 102a-d deployed in the party's outlet(s) with data from some of its other servers. For example, data from the party's inventory management 108a can be used to determine marketing actions that cause adjustments to the stocking of particular products on the shelves at the outlet. That is, if data from the party's inventory management system indicates that the inventory levels for a product are nearly depleted, then this information would enable system 100 to determine that increasing the availability of that product at the party's outlet(s) may not be feasible.

Data stored on inventory management system 108a is organized into data records configured as a suitable data structure or format. FIG. 4A is a diagram of an exemplary embodiment of a data structure 400 for storing inventory information. As can be seen, data structure 400 includes a product/service identity field 402 which identifies the particular product or service. As previously noted, the party storing the information on its backend system 108 could assign unique identity codes (such as UPC codes) corresponding to each of the products it carries in its inventory, or services that it offers. Data structure 400 also includes an outlet identity field 404 identifying a particular outlet, and an inventory level field 406 indicating the number of products the store has at the particular location identified in the outlet field 404. If the data structure identifies a service, inventory level 406 could indicate the remaining capacity at the particular outlet to continue providing the service identified in field 402. Optionally, a field for storing pricing information and/or cost information may also be provided.

Another backend system is the order and customer information system 108b (shown in FIG. 1). This system includes information regarding completed transactions and orders placed, and thus provides information regarding sales volume and customer trends, and is therefore useful for determining marketing actions that affect marketing attributes such as advertisements, pricing, etc.

FIG. 4B is diagram of an exemplary embodiment of a data structure 410 used to store information regarding orders on system 108b. Data structure 410 includes product/service identity field 412 which identifies the particular product or service with respect to which the data in structure 410 is stored. Outlet identity field 414 identifies the particular outlet with respect to which the product/service identified in field 412 was sold or otherwise processed. Sale status field 416 is a flag that indicates whether the product/service was sold, ordered, or returned to the store. Price field 418 provides the sale price (with or without the sales taxes) for the product or service identified by field 412. If the sale status field 416 indicates that the identified product/service was returned, the data in price field 418 would thus indicate a reimbursement amount rather than a sales amount (under those circumstances, the indicated amount could have a negative value). Customer identity field 419 stores information regarding the identity (name, and/or other identifying information) of the consumer who purchased or returned the product/service identified in field 412. Data structure 410 may include additional fields.

Yet another backend system is the pricing database 108c. Pricing database 108c maintains the data corresponding to the prices of the various products or services sold or offered by the party controlling backend system 108. The data in this database may also be useful in determining appropriate marketing actions regarding the party's various products and services. Data maintained on pricing database 108c is also arranged in data records configured as a suitable data structure or format.

Referring to FIG. 4C, a data structure 420 for storing pricing information includes product/service identity field 422 which identifies the particular product or service with respect to which the pricing data in structure 420 is stored. Outlet identity field 424 identifies the particular outlet. The party controlling backend system 108 may decide to assign different prices for the same product/service depending on the specific geographic location of the outlet. For example, an outlet located at a high-end mall may decide to sell a particular product at a price that is higher than the sales price of the same product sold at an outlet located in a less affluent locale. Price field 426 provides the sales price (generally before taxes) for the product or service identified by field 422. Data structure 420 may include additional fields.

Backend system 108 may also include a supplier relationship management (SRM) system 108*d*. The SRM system 108*d* contains information from the various suppliers of the retailer, including such information as purchase orders placed by the retailer, shipments, delivery dates (past and future), rejected faulty shipments, pricing information, and so on. Such information can be used to determine projected inventory levels, and thus facilitate the determination of appropriate marketing actions, as described herein. Data maintained on the SRM system 108*d* is also arranged in data records.

Referring to FIG. 4D, an exemplary data structure 430 for storing supplier information includes product/service identity field 432 which identifies the particular product or service with respect to which the supplier data in structure 430 is stored. The data structure 430 further includes supplier name field 434 which identifies the name of the supplier providing the product/service identified in product/service identity field 432. Quantity level field 436 holds information regarding the number of products/services items corresponding to the product/service identified by the product/service identity field 432. The order status field 438 indicates the status of the shipment corresponding to the product/service in question. For example, the order status 438 provides information regarding delivery dates of the shipment, rejected faulty shipments (and the dates on which such shipments were sent back to the supplier), etc. The data structure 430 can also include price field 439 which provides the value of the shipment associated with the particular record, either in terms of the total price of the entire shipment of the products/services identified by identity field 432, or in terms of a single item of the particular product/service. The data structure 430 may include additional fields.

In addition to the systems 108*a-d*, the backend system may also include a server (not shown) configured to communicate with external servers and systems to receive data that may facilitate the determination of suitable marketing actions, as will be described in greater details below. For example, one such system that may be connected to the backend system 108 is an external server that maintains weather information. Such weather information, providing short-term and long-term weather forecasts could influence marketing actions. For example, a suitable marketing action under circumstances where the short-term weather forecast predicts the occurrence of thunder storms at a particular region would be to increase the inventory level of umbrellas at the retail outlets located at the region where thunder storms are expected to occur. Thus, in some embodiments, data from the external weather server may be transmitted to a server operated by the entity operating backend system 108, whereupon that data may be stored in suitable records, and subsequently forwarded to the central repository 106. Alternatively, the central repository 106 may directly establish a communication link to the externals server to receive the weather data.

Furthermore, additional external systems that maintain data pertaining to other external conditions and factors that may have an impact on possible marketing actions, for example, road and traffic conditions, may also be linked to system 100, either via backend system 108, via central repository 106, or via other systems comprising system 100. Such other external systems maintaining data regarding such exogenous factors include systems having data about consumer trends, economic data (e.g., general availability of raw materials, consumer products, etc.), and all other types of data that may influence the implementation of marketing actions.

Central Repository

Returning to FIG. 1, the information collected and stored at each of the POS devices 102*a-d* and the backend systems 108*a-d* is sent to the central repository 106. The data received at central repository 106 may include data compiled for different outlets and/or different entities.

The data received by central repository 106 is parsed and placed into newly formed records having a standard configuration, thereby enabling consistent subsequent processing and handling of such records.

FIG. 4E is an exemplary data structure 440 for storing the data held in the various types of records that the central repository 106 receives and processes. Accordingly, the data structure 440 is configured to store data previously held in records such as those having one of the data structures 300, 400, 410, 420, 430, or having some other type of data structure.

Thus, as shown in FIG. 4E, data structure 440 includes product/service identity field 442 which identifies the particular product or service with respect to which the data in data structure 440 is stored. The data structure 440 further includes the category field 444, indicating the category or class designation of the product/service, and a product/service description field 446 to provide information regarding the particular product/service in question. The data structure 440 additionally includes outlet identity field 448 which stores the identity of a particular outlet, price field 450 which indicates the price corresponding to the product/service identified by field 442, and status field 452 which indicates the status of the product/service in question (e.g., sold, ordered, returned to the store, etc.).

The data structure 440 may further include an inventory level field 454 which indicates the number of items (for example, in a particular outlet) corresponding to the particular product/service, and a customer identity field 456 to identify a customer associated with a transaction corresponding to the particular record. Additionally, the data structure 440 may also include a supplier name field 458 which identifies the supplier who provided the retailer with the particular product/service, a quantity level field 460, and an order status field 462 providing shipment status information for an order from the supplier identified, for example, in field 458. Further, the data structure 440 may also include contextual information fields such as a time field 464 that provides the time at which the record received and parsed by the central repository 106 was originally created. Another type of contextual field that may be included with data structure 440 is an origin field 466, which identifies the system or device from which the record being processed by the central repository 106 originated (e.g., a POS device, one of backend systems 108*a-d*, etc.). The data structure 440 may include additional fields and/or may have different configurations.

In some circumstances only some of the fields of a record configured as data structure 440 may be populated. For example, the central repository 106 may receive a record configured as data structure 400. The data held in such a record may include the identity of the product/service, the outlet identity and the level of inventory for the particular product/service. The central repository 106 accesses and retrieves the data held in such a record, and uses the retrieved data to populate a new record configured as data structure 440. Thus, under these circumstances, some of the fields of the new record, including, for example, product/service identity field 442, outlet identity field 448 and inventory level field 454 will be populated, while the other fields in the record will remain empty.

In another example, the central repository 106 receives and retrieves the data in a record configured as data structure 430. A new record is created by the central repository 106, and is populated with the retrieved data. Thus, under these circumstances, the product/service identity field 442, the price field 450, the supplier name field 458, the quantity level field 460, and the order status field 462 of the new record will be populated, while the other fields of the record will remain empty. Subsequently, the central repository 106 stores the new record in its storage.

Alternatively, in some embodiments the records received from the POS devices, the backend systems, and/or from other sources, are stored using the same format in which the data was sent by the various systems connected to central repository 106. Thus, data sent by the various POS devices is stored, under these circumstances, in the memory of central repository 106 as a record having the format of data structure 300 shown in FIG. 3. Similarly, data received from the backend systems 108*a-d* is stored as records having the formats of the respective data structures 400, 410, 420 and 430, shown in FIGS. 4A-D.

To store and manage received data, the central repository 106 may use commercially available applications. Suitable commercial and open-source database applications include DB2™, Oracle™, SQL Server™ and PostgreSQL, or any other database application, relational or otherwise. Alternatively, central repository 106 may implement a different data management mechanism for storing and managing the received data.

The POS devices 102*a-d* and backend system 108*a-d* may transmit collected data at set intervals to the central repository 106. For example, transmission from individual POS devices may be sent once every several minutes. The particular time interval may be selected individually for every connected POS device, depending on that POS device's storage size and level of activity associated with that POS device (i.e., how often the POS device is accessed by a consumer).

Alternatively and/or additionally, transmission of data to the central repository 106 may be performed through a system initiated transmission that is triggered through the occurrence of a condition. For example, data may be sent from a POS device, or from one of the backend systems, when a certain volume of data has been collected (e.g., the POS device and/or backend system has collected a certain predetermined number of new records).

Marketing Intelligence System

Referring to FIG. 1, once the data from the POS devices 102*a-d* and the backend systems 108*a-d* is stored in central repository 106, the data is processed by the marketing intelligence system 110 to determine real-time, or near real-time, marketing actions at various outlets and/or at various POS devices 102*a-d*.

Marketing intelligence system 110 includes a control center system 112 having four modules, namely, the workflow engine 114, the segmentation server 116, the machine learning system 118, and the rule engine 120. Control center system 112 includes a user interface to enable operators to interact with the control center 112 and its various modules, thereby enabling operators to exercise control over the functionality of the marketing intelligence system 110. The user interface includes peripheral devices that enable an operator to enter input and specify actions, including a keyboard, mouse, stylus pen, and other peripheral user interface devices.

Figure 5:
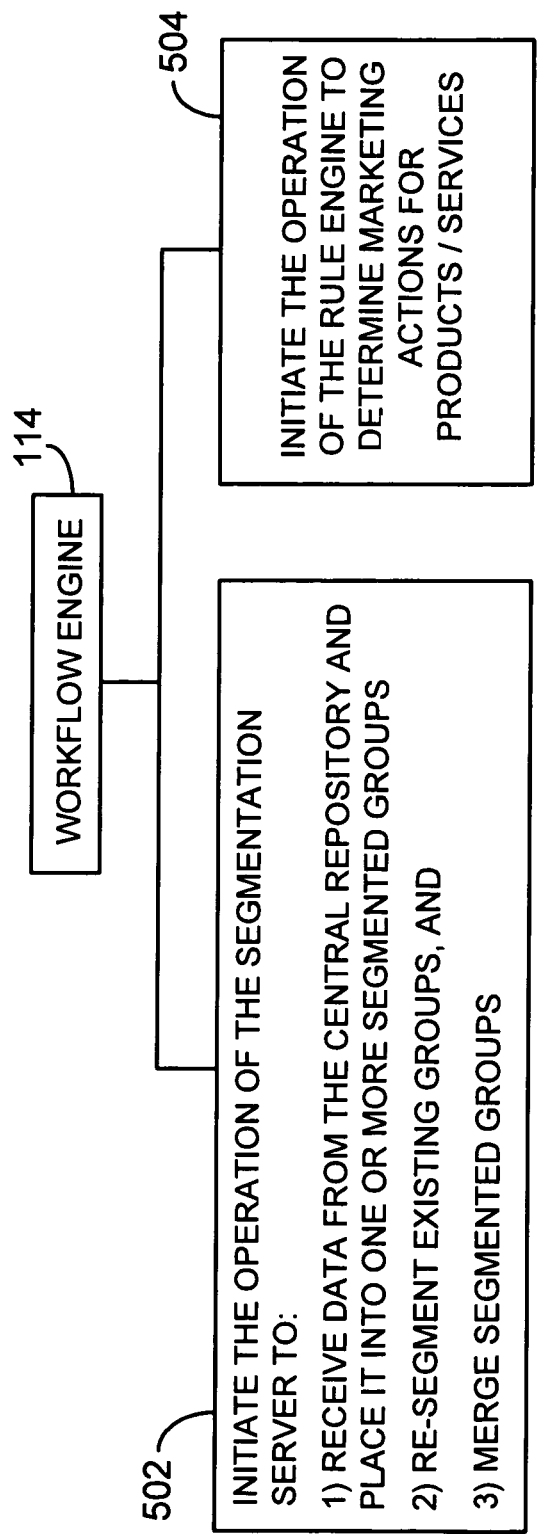
FIG. 5 is a block diagram showing the modules and operations controlled by the workflow engine shown in FIG. 1.

As shown, control center system 112 includes the workflow engine 114. The workflow engine 114 controls the order of execution of the various modules constituting the control center system 112. FIG. 5 is a block diagram showing the operations controlled by the workflow engine 114. The two main operation that the workflow engine 114 initiates are the segmentation operation, performed by the segmentation server 116, and the marketing actions implementation operation, performed by the rule engine 120 and the machine learning system 118.

The Segmentation Operation

As shown in FIG. 5, workflow engine 114 initiates at 502 the operation of segmentation server 116 to receive the data stored in central repository 106, and place it into one or more segmented groups.

Particularly, the segmentation server 116 receives new data (i.e., data that has not yet been placed in one or more segmented groups) from the central repository 106. In some embodiments, the data received from the central repository 106 includes records configured as data structure 440. The segmentation server 116 receives that data through an input interface or port. The interface or input port may be located at the segmentation server 116, or at any of the other modules of the marketing intelligence system 110. To receive data from the central repository 106, the segmentation server 116 sends at regular intervals requests to the central repository 106 to transmit to the segmentation server 116 all data records that have arrived at the central repository 106 since the last time the segmentation server 116 received new records from the central repository 106. Alternatively and/or additionally, further transmissions of records from central repository 106 to the segmentation server 116 may be triggered by the occurrence of some conditions. Central repository 106 determines which of the data records stored in its storage have not yet been sent to the segmentation server 116. The central repository 106 can make that determination by associating a status flag with every record it has in storage which indicates whether that record had previously been sent to the segmentation server 116. Data records whose status flag indicates that they have not yet been sent to the segmentation server 116 are thus retrieved from the central repository 106 and sent to the segmentation server 116.

The data received at the segmentation server 116 thus includes all new records holding the information collected by the POS devices 102*a-d*, and/or data provided by the backend systems 108*a-d*.

Once the data corresponding to the consumers input, associated contextual input and/or backend system information is received, the segmentation server 116 of the marketing intelligence system 110 places the received data into segmented groups.

The segmented groups are sets of data having similar characteristics (the segmented groups thus represent homogenous data sets). By segmenting the received data into such data sets, analysis and operations performed on those segmented groups is more likely to lead to more focused, and thus more effective, marketing actions.

Figure 6:
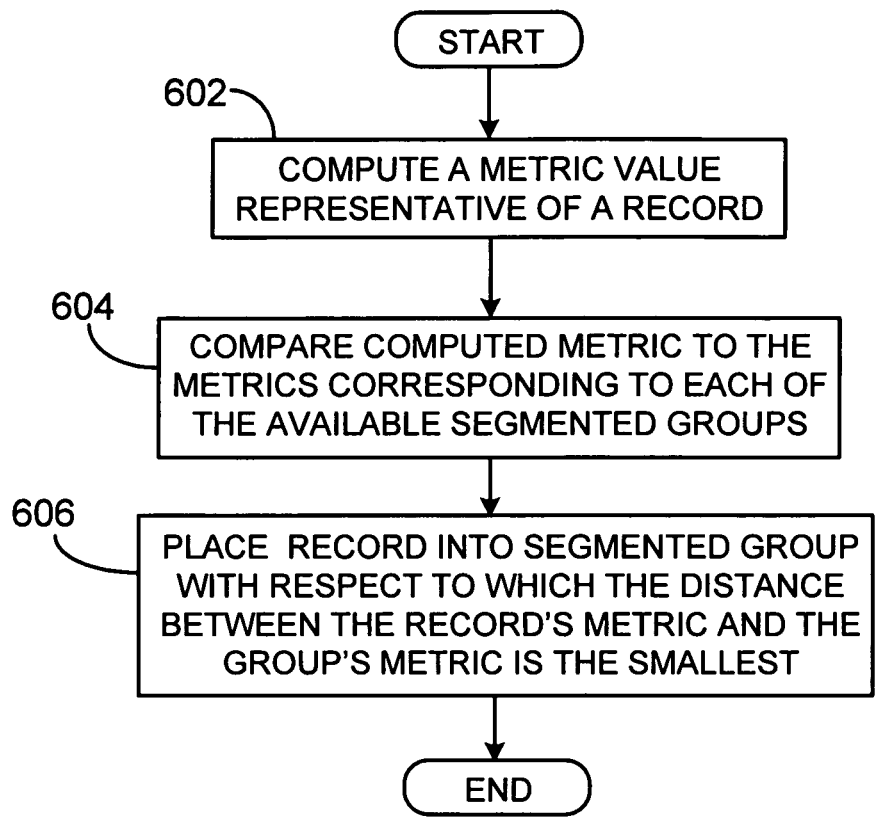
FIG. 6 is a flowchart of an exemplary embodiment of a procedure performed by segmentation server, shown in FIG. 1, to place data into segmented groups.

FIG. 6 is a flowchart of an exemplary embodiment of a procedure 600 performed by segmentation server 116 to place a received new data record into one of the segmented groups maintained by segmentation server 116. The segmentation server 116 computes for the new (and unplaced) data record received from central repository 106 a metric, or distance function value, representative of the record (at 602). In some embodiments, the metric is computed by retrieving the content of some of the fields in the data record, assigning numerical values representative of the content of those fields, and calculating a weighted sum based on the assigned value. For example, suppose the new record to be placed corresponds to a product, such as a cell phone, and the record processed by the segmentation server 116 is formatted using data structure 440 shown in FIG. 4E. The value of the product/service identity field may be retrieved from the field 442 of the record. That value may be used to access a look-up table that holds a numerical value corresponding to the cell phone product, as identified by the identity code in field 442. A pre-determined weight value may be used to multiply the assigned value for the product identified by field 442. Similarly, the value of the outlet identity may also be retrieved, and likewise, a corresponding numerical value may be assigned that corresponds to the identity of the outlet indicated by field 448 of the record. Again, a pre-determined weight value may be used to multiply the assigned value with that weight. Similar operations may be performed with respect to the record's other fields, whereby a numerical value corresponding to the particular content of each field is determined, and thereafter that numerical value is multiplied by a pre-determined weight. Thus, the metric corresponding to the new record is calculated as a weighted sum corresponding to the content of the particular record that is to be placed in one of the segmented groups.

The particular weights that are used to compute the weighted sum are pre-determined, and are set by an operator controlling and interacting with the marketing intelligence system 110 through control center system 112. The weights reflect the importance of particular fields in terms of their potential impact on the effectiveness of possible marketing actions that may be performed. For example, in some embodiments it may be determined that the location of the outlet is more important than the particular nature of the product corresponding to the record that is to be placed. Specifically, marketing operations are often performed on a large array of products in a particular outlet location (e.g., when all items of a specific category are discounted by 30% in a particular store, as opposed to a single item being discounted). Under those circumstances a higher weight would be used to weigh the assigned value corresponding to the outlet identity, than the weight used for the product, thereby reflecting the higher importance of placing the record into a segmented group whose similar characteristic may be that the records placed therein correspond to similar (or the same) outlets. Similarly, a high weight value may be used to weigh, for example, the category field 444 to reflect its relatively high importance in placing records into segmented groups.

Other schemes for computing a metric for the record to be placed may be used. Further, the computed metric may be a vector metric rather than a scalar metric.

The computed metric enables the segmentation server 116 to compare the corresponding record to existing groups, and to thereafter put the record into the group with which the record has the most in common. Particularly, the segmentation server 116 compares the computed metric for that data record to the corresponding metrics for each of the available segmented groups maintained by the segmentation server 116 (at 604). The segmentation server 116 maintains on its storage one or more segmented groups. The metrics for each of the segmented groups is re-computed every time a new record is added to a segmented group. In some embodiments the computed metric for each of the segmented groups is an average metric value computed from some or all the data records placed in the respective segmented groups. The comparison operation between the metric of the new record to be placed and each of the metrics corresponding to the respective segmented groups may be performed by, for example, calculating the difference between the metrics values. The computation of the difference values between the metric of the new record and the metrics corresponding to the various segmented groups thus results is the determination of a "distance" or "deviation" value.

Subsequently, the segmentation server 116 places the new record into the segmented group with respect to which the distance, or deviation, between the new record's metric and the segmented group's metric is the smallest (at 606). In some embodiments the new record may be placed into more than one segmented group. Thus, procedure 600 determines the best fit between the new record and one or more segmented groups.

Another function performed by the segmentation server 116 is to re-segment groups that have become over-heterogeneous, and thus need to be re-segmented into groups of closer similarity, by identifying the similar portions of the existing groups, and re-dividing them into new more homogenous groups. The groups could either become smaller (as they are divided to sub-groups), or some of these sub-groups, previously belonging to different groups, can be grouped together to form a new, more homogenous group of any size. In some embodiments re-segmentation is performed at regular intervals. Alternatively and/or additionally, re-segmentation may be initiated by an operator interacting with the control center 112 through, for example, user interfaces.

Initially, several segmented groups may be formed. The groups may be created by the operator issuing commands that cause memory areas in the storage on segmentation server 116 to be allocated to one or more of the initially formed segmented groups. Subsequently, the initial batch of records sent from central repository 106 is placed into one of those initially formed segmented groups. After the formation of the initial segmented groups, additional segmented groups are dynamically formed.

Every segmented group formed has to conform to two main requirements. The first is that the members (i.e., data records) within each group have to have similar characteristics. In other words, the content of the segmented group has to be substantially homogeneous. This requirement recognizes the fact that marketing actions applied to non-homogeneous groups are likely to yield unpredictable and ineffective performance outcomes. For example, a group that contains records pertaining to electronic merchandise and apparel items is less likely to produce predictable and effective outcomes in response to particular marketing actions (e.g., increase in advertising campaigns, discounts, etc.) than a group that contains records pertaining only to electronic merchandise.

The extent of similarity between data record members in a segmented group can be established by a representative metric, such as the metric or distance function, used to determine the placement of a new data record into one of the segmented groups. The metric of each segmented group may be an average scalar, or average vector value. In some embodiments the data records within a group will be deemed to be similar if the difference between their corresponding individual metrics and the average metric for that segmented group are less than a pre-determined standard deviation. The standard deviation for a group may be represented as a scalar or vector value. Alternatively, the standard deviation may be some other measurement indicative of the permissible level of difference between a particular data record and the average metric for its associated segmented group.

The second requirement imposed on the segmented groups is that each of the segmented groups should have a minimum number of members. The requirement recognizes the fact that processing performed on a sample size (i.e., the number of data records) that is too small might result in erroneous results due to statistical aberrations. This requirement, regarding the minimum number of records, is initially relaxed to allow data records sent from central repository 106 to be placed into one or more of the originally formed segmented groups. However, once the segmented groups have been sufficiently populated with data records, this requirement is asserted.

During regular operation of the marketing intelligence system 110 the segmentation server 116 determines at regular intervals (e.g., every 15 minutes) whether one or more of the segmented groups should be re-segmented into two or more separate groups that are more homogenous than the parent segmented group. For example, suppose that a particular segmented group contains records pertaining to all products and services at a particular outlet. Although the data records in such a group pertain to the same outlet location, and thus marketing actions (e.g., a general advertising campaign for the outlet) performed with respect to such a group may yield satisfactory outcomes, the effectiveness of the marketing actions may increase if the marketing actions were performed with respect to more homogenous groups. Thus, re-segmentation is performed if it is determined that the original parent group can be split into several separate groups (e.g., apparel products, appliances, and a group containing all the records that do not correspond to either apparel or appliance products), that would each still have the minimum required number of records. Records pertaining to those newly formed segmented group would be assigned (i.e., re-placed) from the parent group to the new groups. The parent group would retain the records not assigned to the new segmented groups.

Figure 7A:
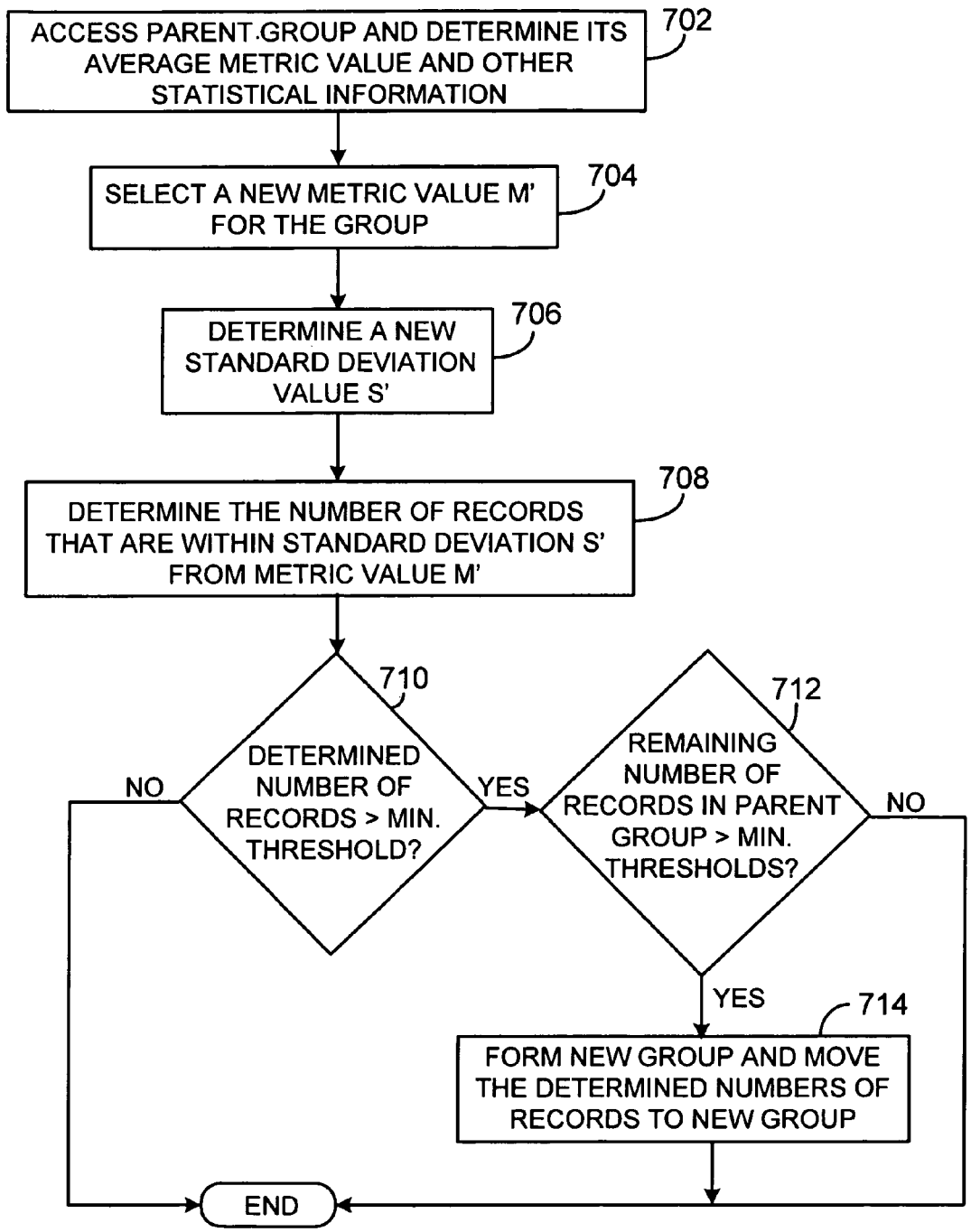
FIG. 7A is a flowchart of an exemplary embodiment of a re-segmentation procedure performed by the segmentation server shown in FIG. 1, on a segmented group.

FIG. 7A is a flowchart of an exemplary re-segmentation procedure 700 performed by segmentation server 116 on a particular segmented group, referred to as the parent group. The segmentation server 116 accesses the parent segmented group and determines the group's average metric value, M, and other statistical information associated with the group, including the standard deviation, S, of that segmented group (at 702). The segmentation server 116 then selects a new metric value, M', corresponding to some value that is within the standard deviation from current average metric of the segment group (at 704). For example, the segmentations server 116 selects a value that is equal to the current average metric, plus half the value of the current standard deviation for that group (i.e., $M'=M+0.5 \times S$). The segmentation server 116 then determines a new standard deviation, S', that it uses to assess whether there are sufficient data records within the current segmented group that are within the new standard deviation S' from the new metric value M' (at 706). The segmentation server 116 next determines the number of data records within the current group whose distance from the new metric value M' is within the new standard deviation S' (at 708). The segmentation server 116 then determines if the number of records that meet this requirement is greater than a pre-determined threshold representative of the minimum number of records that can be placed in a segmented group (at 710). The segmentation server 116 then determines whether the remaining number of records in the parent group, should the parent group be re-segmented, will also exceed the minimum number of allowed records in a segmented group (at 712). If there remains a sufficient number of records in the parent group, then the segmentation server forms a new segmented group, and moves the data records identified as being within the new standard deviation S' from the new metric value M' to the newly formed group (at 714). The segmentation server may subsequently repeat the procedure 700 on the parent segmented group to determine if the parent group should be further segmented. If the procedure 700 is repeated, different metric and standard deviation values may be used.

A further function performed by the segmentation server 116 is to combine two or more groups that strongly resemble each other into a single homogenous group. This function may also be performed by the segmentation server 116 at regular intervals (e.g., every 15 minutes), or it may be initiated by an operator interacting with the control center 112 through a user interface.

The resemblance between two or more groups may be determined by comparing computed metrics, for each of the groups, that are representatives of the degree of homogeneity of the groups. For example, the homogeneity of a group may be represented by a metric M which could be the computed weighted average value of the members of the group, and another metric S that represents the standard deviation corresponding to that group's members. Thus, in some embodiments, two groups may be determined to resemble each other if the difference between their respective average weighted values, $M_1$, and $M_2$, is below a pre-determined threshold (e.g., the difference between $M_1$ and $M_2$ being less than 1%), and each of the groups' corresponding standard deviations is less than some pre-determined threshold.

Figure 7B:
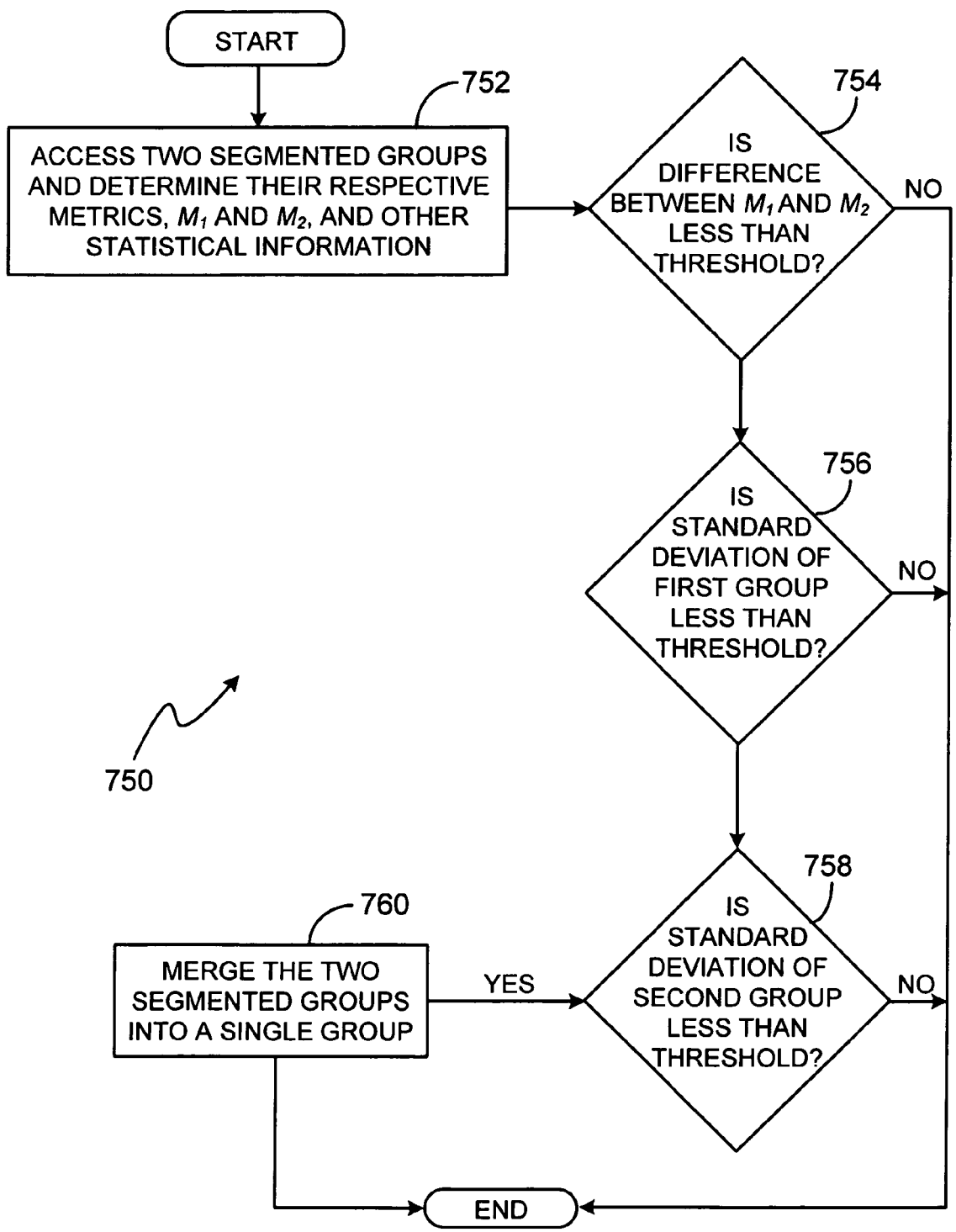
FIG. 7B is a flowchart of an exemplary embodiment of a group merging procedure performed by the segmentation server shown in FIG. 1.

FIG. 7B is a flowchart of an exemplary group-merging procedure 750 performed by segmentation server 116 on two groups. The segmentation server 116 accesses the two segmented groups and determines those groups' corresponding metric values, as well as other statistical information associated with the groups which would enable to establish the degree of homogeneity of the two groups (at 752). Thus, in some embodiments the segmentation server 116 computes a weighted average value, $M_1$, and $M_2$, for each of the two groups being processed. These metrics are computed from the values (or content) in the fields of the records maintained in the two groups. The segmentation server 116 also computes standard deviation values, $S_1$ and $S_2$ for each of the groups being processed.

Once the metric values and corresponding statistical information are computed, the segmentation server 116 compares the computed metric values (at 754). If the difference between the two computed values is below a pre-determined threshold (e.g., 1%), thus indicating that the two groups being compared might resemble each other, the segmentation server 116 next determines the degree of homogeneity of each of the groups. In other words, although, for example, the respective averages of the two groups might be close to each other, there may nevertheless be a large variation in the metric values of individual group members (i.e., the various records) in at least one of the groups, thereby precluding the merging of those two groups.

Accordingly, the segmentation server 116 determines if the standard deviation corresponding to one of the groups is less than a pre-determined threshold (at 756). If the standard deviation $S_1$ is less than a pre-determined threshold, thus indicating a strong degree of homogeneity in that group, the segmentation server 116 then determines whether the standard deviation corresponding to the other group (i.e., $S_2$) is also less than the pre-determined threshold (at 758). It is to be noted that two different threshold values may be used with respect the either of the two groups. If $S_2$ is determined to be less than the pre-determined threshold, the two processed groups are deemed to resemble each other, and are thus merged (at 760). Merging of the two groups may be done by assigning or associating all the member records from one group to the other group. Storage space allocated to the group whose records had been assigned to the other group are de-allocated.

If the segmentation server 116 determines that the difference between the respective metric values $M_1$ and $M_2$ is higher than the corresponding pre-determined threshold, or that the respective standard deviations of the processed groups are higher than their corresponding pre-determined thresholds, the procedure 750 terminates.

Once the procedure 750 has been performed with respect to two particular groups, the segmentation server 116 repeats the procedure 750 to determine whether another combination of two groups (one of which may be one of the groups previously processed) should be merged. Thus, in some embodiments, the segmentation server 116 determines with respect to any combination of two groups whether they should be merged. In some embodiments the merging procedure may be implemented so that all the various metrics and corresponding statistical values of the various groups are first computed, and then sorted to identify likely candidate groups that may be substantially homogenous. Other procedures and/or techniques for merging substantially homogenous groups may be used.

The Marketing Action Implementation Operation

With reference again to FIG. 5, as can be seen at 504, another operation that workflow engine 114 launches at regular intervals is the execution of the rule engine 120 (shown in FIG. 1) to determine marketing actions with respect to products and services associated with to the various segmented groups. The rule engine 120 applies one or more rules defined in a rule repository 122 on a particular segmented group to determine marketing actions, if any, for the particular segmented group being processed.

Figure 8:
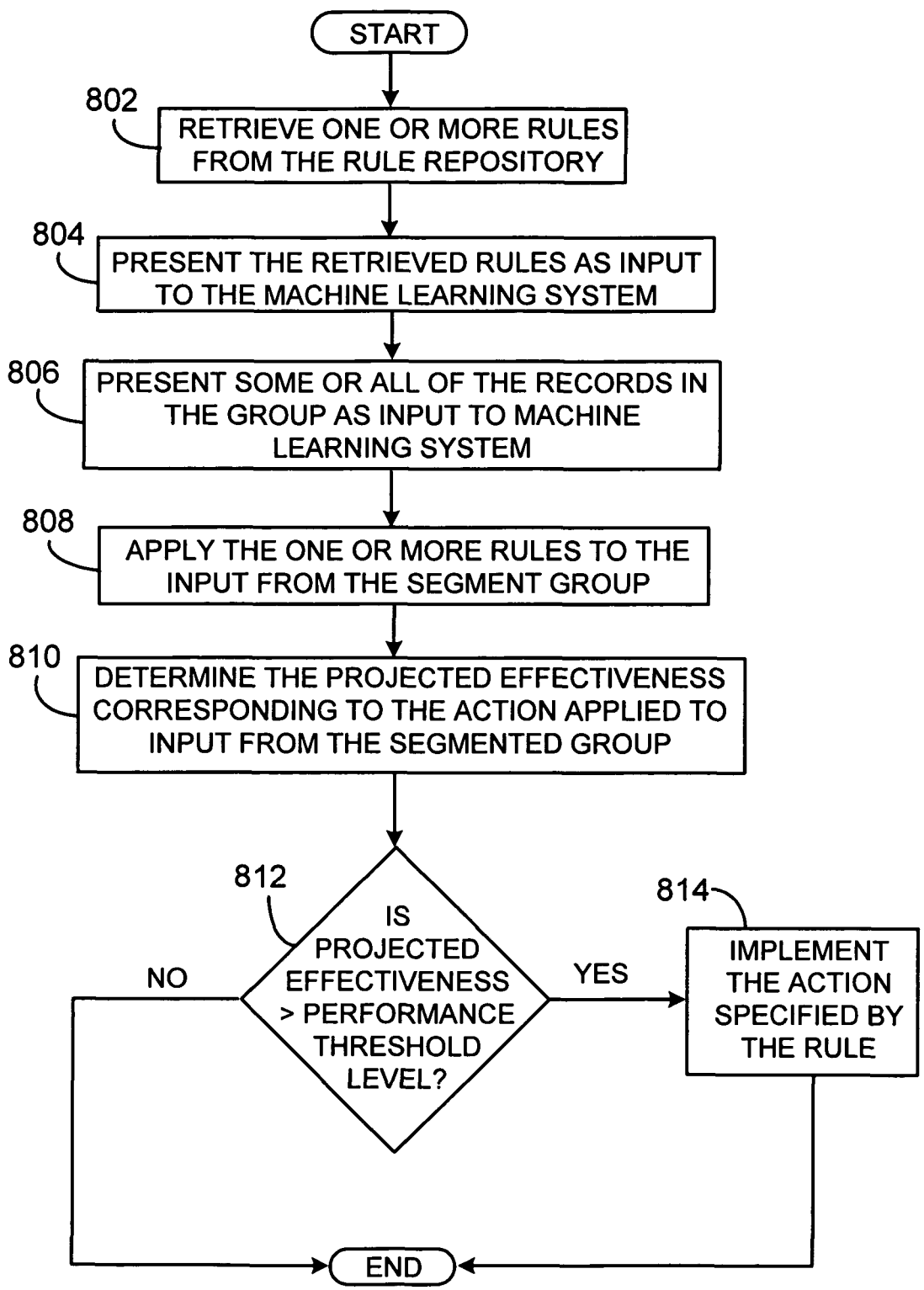
FIG. 8 is a flowchart of an exemplary procedure to determine and implement marketing actions on a segmented group.

FIG. 8 is a flowchart of an exemplary procedure 800 to determine what marketing actions are to be performed on a particular segmented group. As shown, the rule engine 120 first retrieves from the rule repository 122 one or more rules associates with the segmented group with respect to which marketing actions may be taken (at 802). In some embodiments the rules may be defined with respect to some, but not all of the members of the groups, and thus marketing actions associated with such rules are applied only to some of the members. For example, marketing actions may be applied to certain products and/or services associated with a particular group (or to products/services available at particular outlets), but not applied to other products/services associated with that group. In other embodiments rules may be defined with respect to all the members of a group, and thus any marketing action that is taken as a result of the application of such a rule, as described herein, is taken with respect to all the members of the group.

The rules stored on rule repository 122 define proposed marketing actions that may be performed on one or more of the products/services associated with the segmented group being processed. The marketing actions are possible changes to one or more marketing attributes associated with the products/services in the group. The marketing attributes that can be changed include changes to the pricing of the products/services, changes to the inventory levels for the products/services of the group, changes to the level of in-store advertising for the products/services, changes to the level of the out-of-store advertising of the products/services, and/or offering for sale a combination of products/services in specially priced package deals. Other types of marketing actions that change different marketing attributes of products/services associated with a group may also be performed.

Marketing actions specified in rules are associated with corresponding projected performance threshold levels. For a specified marketing action to be implemented, its associated projected performance threshold has to be exceeded. For example, a possible rule could be one that specifies a marketing action of decreasing the prices for the products/services in the group by 20%. The associated projected performance threshold level for the rule could be a 15% increase in sales volume. Thus, for that rule, the specified action would only be implemented if the projected effectiveness of implementing the rule would result in a 15% increase (or higher) in the sales volume for the products/services.

The specified action and associated projected performance threshold level are generally encoded using pre-defined syntax. For example, a rule record could be defined in which one field would specify the type of action to be implemented (e.g., change pricing), another field could specify the level of change, yet another field could specify the performance outcome that is to be examined (e.g., change in sales volume), and another field could specify the projected performance threshold.

Turning back to FIG. 8, after the one or more rules for the particular segmented group being processed has been retrieved, the rule engine 120 presents 804 the retrieved rules as input to the machine learning system 118.

A machine learning system is a system that iteratively analyzes training input data and the input data's corresponding output, and derives functions or models that cause subsequent inputs to produce outputs consistent with the machine's learned behavior. Machine learning system 118 is thus configured to accept as input the data records available at a particular segmented group, and produce an output based on the past output.

In some embodiments, the learning machine system 118 implements a neural network system. A neural network includes interconnected processing elements (effectively the systems neurons). The connections between processing elements in the net have weights that cause output from one processing element to be weighed before being provided as input to the next interconnected processing elements. The weight values between connections can be varied, thereby enabling the neural network to adapt (or learn) in response to training data it receives.

In some embodiments, the learning machine system 118 implements a support vector machine. Support vector machines (SVM) generate functions from a set of labeled training data. The function can be a classification function (i.e., the output is binary) or the function can be a general regression function. When a support vector machine is used for classification applications, the support vector machine creates a hyperplane (or several hyperplanes) that separates data into two classes (or more, if several hyperplanes are used) with maximum margins. When training examples that are labeled either yes or no are provided, a maximum-margin hyperplane splits the training examples such that the distance from the closest examples to the hyperplane is maximized, thereby resulting in a dividing hyperplane that is far as possible from the two divided sets of the training data. An advantage of SVM is that it enables the determination of a "certainty" or "likelihood" measure associated with the classification of a particular item of data. The determination of the likelihood measure may be based on the distance of the item of data from the dividing hyperplane. The closer the item of data is to the hyperplane, the lower the likelihood that the classification of that item of data is correct.

In some embodiments, the learning machine system 118 implements decision trees techniques. A decision tree is a graph of decisions and their possible consequences (e.g., resource costs, and risks), and are thus used to create a plan to reach a goal. A decision tree takes as input an object or situation described by a set of properties, and outputs a decision (i.e., an outcome). Although decision trees often output a yes/no decision (representative of a Boolean function), functions with a larger range of outputs can also be represented. Decision trees classify instances by sorting them down the tree from the root node to a leaf node, thereby providing a classification of the instance. Each node in the tree specifies a test of some attribute of the instance, and each branch descending from that node corresponds to one of the possible values for this attribute. Like neural network systems and machine vector systems, a decision tree is constructed using a training data set.

In some embodiments, the learning machine system 118 implements regression techniques. Regression techniques produce functions (e.g., curves) that best fit a given set of data points. Thus, regression techniques use training data to derive the best fit curve. That curve is subsequently applied to input data to determine its output based on the derived curve. Derivation of best fit curves are typically the solutions to optimization problems, in which a particular error measure (e.g., least-square error) is being minimized.

Other types of machine learning systems, implementing various types of machine learning techniques, may be used.

Thus, initially a training data set is used to define the response of the machine learning system 118. The training data set can be as extensive and comprehensive as desired, or as practical. Such a training set would present as input to the learning machine historical marketing data. The training data set would be presented in a format that is similar to the input that would subsequently be available in the segmented groups. Accordingly, such training data set would include records formatted, for example, using data structure 440. Such training data sets would correspond to consumers' historical interest in particular products and/or services, historical data about inventory levels, pricing information, consumers' trend information, etc. The output corresponding the training data is the historical marketing performance (e.g., sales volume) that was achieved when a certain marketing action was performed in relation to the historical input data (e.g., changing the prices for various product/services, changing inventory levels, changing the volume of advertising, etc.). At the end of the learning process, the machine learning system 118 is ready to accept input from the segmented groups on the segmentation server 116.

Thus, at 806 (of FIG. 8), some or all of the records in the segmented group are presented as input to the machine learning system 118. The rule engine 120 may first extract some of the information from the various data records and arrange the extracted information in a format that is compatible with the inputs of the machine learning system 118. For example, if the machine learning system 118 is configured to accept as input information pertaining only to the product/service of a record, the time at which that record was initially created, and the location of the corresponding outlet, the rule engine 120 would first extract that information from the some or all of the records in the segmented group and arrange them in the appropriate format.

The rule engine 120 then applies the one or more rules associated with the segmented group (at 808). The machine learning system 118 is configured to accept as input (and thus recognize) the particular action specified in the applied rule.

The machine learning system 118 thus accepts the input data corresponding to the records in the segmented group, and the specified actions to be tested, and determines the projected effectiveness of that action for the input data by having the machine learning system 118 process and respond to the input data and specified action (at 810).

The resultant output generated by the machine learning system 118 is a value that is indicative of the projected marketing performance given the data input provided, and the marketing action specified. The rule engine 120 then compares the resultant output of the machine learning system 118 to the projected performance threshold level associated with the applied rule (at 812).

If the resultant output produced by the machine learning system 118 is less than the projected performance threshold level, no action is taken. If there are additional rules associated with the segmented group being processed that are to be tested, then those rules are applied to determine the projected effectiveness for the actions specified by those rules (the various rules can be tested in parallel or sequentially). If there are no other rules associated with the segmented group being processed, then the rules for that segmented group can be applied again at some later time (e.g., two hours later).

If however, the resultant output produced by the machine learning system 118 matches or exceed the projected performance level associated with the rule, then the rule engine 120 implements the action specified by the rule by generating commands that are sent to the respective systems and devices of the system 100 that are affected by the action to be implemented (at 814).

For example, suppose it is determined that an action of reducing by 20% the prices for a particular brand of men's shirts results in a projected effectiveness that exceeds the associated projected performance threshold level. Under these circumstances the rule engine 120 implements this action by issuing a command to reduce by 20% the prices for those men's shirts on the records maintained on pricing database 108c (i.e., field 426).

In another example, suppose that it is determined that an action of increasing in-store advertising for a particular service (e.g., travel service) has a projected effectiveness that exceeds the action's associated projected performance threshold level. Under these circumstances, the rule engine 120 implements this action by issuing commands to the POS devices 102a-d, and/or to the content distribution server 104, that result in more frequent presentation of content for that travel service on the POS devices 102a-d.

Other actions, associated with other rules that may be executed for the same segmented group, may result in additional marketing actions that will change other marketing attributes for the products/services associated with that segmented group.

Returning to FIG. 1, as further shown, information produced by the marketing intelligence system 110 is sent to the reporting module 130. Reporting module 130 includes a display device to enable presenting information related to the operation of system 100. For example, reporting module 130 displays information regarding marketing actions taken, information pertaining to products/services processed by system 100, information regarding consumers' behavior, as well as information regarding the general operation of system 100.

Other Embodiments

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method for automatically performing marketing actions, the method comprising:
   receiving consumer input relating to a marketable item from a service information display located at an outlet;
   receiving contextual input associated with the consumer input;

placing the received consumer input and associated contextual input into one or more segmented data groups, wherein each segmented group includes consumers data and associated contextual data having similar characteristics, and wherein each segmented group has sufficient consumers data and associated contextual data to enable statistical analysis;

computing for the marketable item, by at least one computing device, a projected marketing effectiveness corresponding to one or more pre-determined changes to respective one or more marketing attributes associated with the marketable item, where the one or more predetermined changes to the respective one or more marketing attributes define a marketing action specified in a rule associated with one of the one or more segmented groups; and automatically changing by the at least one computing device the one or more marketing attributes associated with the marketable item according to the marketing action specified in the rule when the projected effectiveness computed using the one or more predetermined changes specified in the rule is equal to or exceeds a corresponding pre-defined threshold specified in the rule that is compared to the computed projected effectiveness, and maintaining the one or more marketing attributes unchanged when the projected effectiveness computed using the one or more pre-determined changes specified in the rule is less than the corresponding pre-defined threshold specified in the rule that is compared to the computed projected effectiveness, wherein the marketing action corresponding to the one or more pre-determined changes to the respective one or more marketing attributes associated with the marketable item include one or more of: a change to inventory level associated with the marketable item, or a change to an amount of advertising presented in relation to the marketable item;

wherein the method further comprises:

determining for a particular segmented group from the one or more segmented data groups an average metric value, M, and a standard deviation value, S, for metric values associated with each of one or more data records in the particular segmented group;

determining a new average metric, M', according to $M'=M+0.5S$;

determining a new standard deviation value, S', based on the new average metric M' and the metric values associated with each of the one or more data records in the particular segmented group; and segmenting the particular segmented group into at least two new segmented groups based, at least in part, on a determination that number of data records in the particular segmented group whose metric value is within S' from the new average metric M' exceeds a pre-determined group size threshold.

2. The method of claim 1, wherein the contextual input includes at least one of: geographical location of the outlet, location of the information display within the outlet, and time at which input was received.

3. The method of claim 1, further comprising receiving data corresponding to at least one of: consumer behavior and trends, sales volume, inventory levels, and external conditions.

4. The method of claim 1, wherein the one or more marketing attributes include at least one of: price, package deal, in-store advertisement, out-or-store advertisement, and inventory level.

5. The method of claim 1, wherein computing the projected effectiveness comprises determining whether the one or more changes to the respective one or more marketing attributes associated with the marketable item will result in a level of change of a corresponding marketing-related performance parameter for that marketable item that exceeds the corresponding pre-defined value.

6. The method of claim 5, wherein the corresponding marketing-related performance parameter includes at least one of: increased sales, and increased marketing interest.

7. The method of claim 1, wherein computing the projected effectiveness is based on historical data that relates past changes of marketing attributes of marketable items to corresponding resultant changes to historical marketing-related performance parameters for those marketable items.

8. The method of claim 7, wherein computing the projected effectiveness is performed using a machine-learning technique.

9. The method of claim 8, wherein the machine learning technique includes at least one of: support vector technique, neural network technique, technique based on decision trees, and a regression technique.

10. The method of claim 1, wherein placing the received consumer input and associated contextual input into one or more segmented data groups comprises:

computing a metric representative of the consumer input and associated contextual input;

performing a comparison of the metric to respective metrics of available segmented data groups; and placing the consumer input and associated contextual input into the one or more segmented data groups based on the comparison.

11. The method of claim 1, wherein the service information display includes at least one of: a touch screen, an informational kiosk, and a PDA.

12. A system that automatically performs marketing actions, the system comprising:

a service information display located at an outlet configured to receive consumer input regarding a marketable item;

communication interface configured to receive from the service information display the consumer input and contextual input associated with the consumer input;

a storage segmented into data groups that maintain consumers data and associated contextual data having similar characteristics, each of the segmented data groups includes sufficient consumers data and associated contextual data to enable statistical analysis;

a processing module configured to:

place the consumer input and associated contextual data into one or more of the segmented groups; and compute for the marketable item a projected marketing effectiveness corresponding to one or more pre-determined changes of respective one or more marketing attributes associated with the marketable item, where the one or more pre-determined changes to the respective one or more marketing attributes define a marketing action specified in a rule associated with one of the one or more segmented groups; and a rule engine configured to automatically change the one or more marketing attributes associated with the marketable item according to the marketing action specified in the rule when the projected effectiveness computed using the one or more pre-determined changes specified in the rule is equal to or exceeds a corresponding pre-defined threshold specified in the rule that is compared to the computed projected effectiveness, and to maintain the one or more marketing attributes unchanged when the projected effectiveness computed using the one or more pre-determined changes specified in the rule is less than the corresponding pre-defined threshold specified in the rule that is compared to the computed projected effectiveness, wherein the marketing action corresponding to the one or more pre-determined changes to the respective one or more marketing attributes associated with the marketable item include one or more of: a change to inventory level associated with the marketable item, or a change to an amount of advertising presented in relation to the marketable item;

wherein the processing module is further configured to:
determine for a particular segmented group from the one or more segmented data groups an average metric value, M, and a standard deviation value, S, for metric values associated with each of one or more data records in the particular segmented group, determine a new average metric, M', according to M'=M+0.5S, determine a new standard deviation value, S', based on the new average metric M' and the metric values associated with each of the one or more data records in the particular segmented group, and segment the particular segmented group into at least two new segmented groups based, at least in part, on a determination that number of data records in the particular segmented group whose metric value is within S' from the new average metric M' exceeds a pre-determined group size threshold.

13. The system of claim 12, wherein the contextual input includes at least one of: geographical location of the outlet, location of the information display within the outlet, and time at which input was received.

14. The system of claim 12, wherein the communications interface is further configured to receive data corresponding to at least one of: consumer behavior and trends, sales volume, inventory levels, and external conditions, and wherein the received data is stored on the storage.

15. The system of claim 12, wherein the one or more marketing attributes include at least one of: price, package deal, in-store advertisement, out-or-store advertisement, and inventory level.

16. The system of claim 12, wherein the data processor is configured to compute the projected effectiveness by determining whether the one or more changes of the respective one or more marketing attributes for the marketable item will result in a level of change of a corresponding marketing-related performance parameter for that marketable item that exceeds the corresponding pre-defined value.

17. The system of claim 16, wherein the corresponding marketing-related performance parameter includes at least one of: increased sales, and increased marketing interest.

18. The system of claim 12, wherein the processing module is configured to compute the projected effectiveness based on historical data that relates past changes of marketing attributes of marketable items to corresponding resultant changes to historical marketing-related performance parameters for those marketable items.

19. The system of claim 18, wherein the processing module includes a machine-learning system.

20. The system of claim 19, wherein the machine-learning system includes at least one of: support vector machine, a neural network machine, a machine that implements decision tree techniques, and a machine that implements regression techniques.

21. The system of claim 12, wherein the processing module is configured to place the consumer input and associated contextual input into one or more of the segmented data groups by:
computing a metric representative of the consumer input and associated contextual input;
performing a comparison of the metric to respective metrics of available segmented data groups; and
placing the consumer input and associated contextual input into the one or more segmented data groups based on the comparison.

22. The system of claim 12, wherein the service information display includes at least one of: a touch screen, an informational kiosk, and a PDA.

23. A computer program product residing on a computer readable medium and comprising computer instructions that when executed on a processor-based device cause the processor-based device to:
receive consumer input relating to a marketable item from a service information display located at an outlet;
receive contextual input associated with the consumer input; place the received consumer input and associated contextual input into one or more segmented data groups, wherein each segmented group includes consumers data and associated contextual data having similar characteristics, and wherein each segmented group has sufficient consumers data and associated contextual data to enable statistical analysis;
compute for the marketable item a projected marketing effectiveness corresponding to one or more pre-determined changes to respective one or more marketing attributes associated with the marketable item, where the one or more pre-determined changes to the respective one or more marketing attributes define a marketing action specified in a rule associated with one of the one or more segmented groups; and
automatically change the one or more marketing attributes associated with the marketable item according to the marketing action specified in the rule when the projected effectiveness computed using the one or more pre-determined changes specified in the rule is equal to or exceeds a corresponding pre-defined threshold specified in the rule that is compared to the computed projected effectiveness, and to maintain the one or more marketing attributes unchanged when the projected effectiveness computed using the one or more pre-determined changes specified in the rule is less than the corresponding pre-defined threshold specified in the rule that is compared to the computed projected effectiveness, wherein the marketing action corresponding to the one or more pre-determined changes to the respective one or more marketing attributes associated with the marketable item include one or more of: a change to inventory level associated with the marketable item, or a change to an amount of advertising presented in relation to the marketable item wherein the computer instructions further cause the processor-based device to:
determine for a particular segmented group from the one or more segmented data groups an average metric value, M, and a standard deviation value, S, for metric values associated with each of one or more data records in the particular segmented group, determine a new average metric, M', according to M'=M+0.5S, determine a new standard deviation value, S', based on the new average metric M' and the metric values associated with each of the one or more data records in the particular segmented group, and segment the particular segmented group into at least two new segmented groups based, at least in part, on a determination that number of data records in the particular segmented group whose metric value is within S' from the new average metric M' exceeds a pre-determined group size threshold.

24. The computer program product of claim 23, wherein the contextual input includes at least one of: geographical location of the outlet, location of the information display within the outlet, and time at which input was received.

25. The computer program product of claim 23, further comprising computer instructions that cause the processor-based device to receive data corresponding to at least one of: consumer behavior and trends, sales volume, inventory levels, and external conditions.

26. The computer program product of claim 23, wherein the one or more marketing attributes include at least one of: price, package deal, in-store advertisement, out-or-store advertisement, and inventory level.

27. The computer program product of claim 23, wherein the computer instructions that cause the processor-based device to compute the projected effectiveness include computer instructions that cause the processor-based device to determine whether the one or more changes to the respective one or more marketing attributes associated with the marketable item will result in a level of change of a corresponding marketing-related performance parameter for that marketable item that exceeds the corresponding pre-defined value.

28. The computer program product of claim 27, wherein the corresponding marketing-related performance parameter includes at least one of: increased sales, and increased marketing interest.

29. The computer program product of claim 23, wherein the computer instructions that cause the processor-based device to compute the projected effectiveness is based on historical data that relates past changes of marketing attributes of marketable items to corresponding resultant changes to historical marketing-related performance parameters for those marketable items.

30. The computer program product of claim 29, wherein the computer instructions that cause the processor-based device to compute the projected effectiveness is performed using a machine-learning technique.

31. The computer program product of claim 30, wherein the machine learning technique includes at least one of: support vector technique, neural network technique, technique based on decision trees, and a regression technique.

32. The computer program product of claim 23, wherein the computer instructions that cause the processor-based device to place the received consumer input and associated contextual input into one or more segmented data groups comprises computer instructions that cause the processor-based device to:

compute a metric representative of the consumer input and associated contextual input; perform a comparison of the metric to respective metrics of available segmented data groups; and place the consumer input and associated contextual input into the one or more segmented data groups based on the comparison.

33. The computer program product of claim 23, wherein the service information display includes at least one of: a touch screen, an informational kiosk, and a PDA.

34. A computer-implemented method for automatically performing marketing actions, the method comprising:

receiving consumer input relating to one or more marketable items from a service information display located at an outlet;

receiving contextual input associated with the consumer input;

placing the received consumer input and associated contextual input into one or more segmented data groups, wherein each segmented group includes consumers data and associated contextual data having similar characteristics, and wherein each segmented group has sufficient consumers data and associated contextual data to enable statistical analysis;

computing for at least one of the marketable items, by at least one computing device, a corresponding projected marketing effectiveness corresponding to one or more pre-determined changes to respective one or more marketing attributes associated with the at least one of the marketable items, where the one or more pre-determined changes to the respective one or more marketing attributes define one or more marketing actions specified in one or more rules associated with some of the one or more segmented groups; and automatically changing by the at least one computing device the one or more marketing attributes associated with the at least one of the marketable items according to the one or more marketing actions specified in the rule when the corresponding projected effectiveness computed using the one or more pre-determined changes specified in the rule is equal to or exceeds a corresponding pre-defined threshold specified in the rule that is compared to the computed projected effectiveness, and maintaining the one or more marketing attributes unchanged when the projected effectiveness computed using the one or more pre-determined changes specified in the rule is less than the corresponding pre-defined threshold specified in the rule that is compared to the computed projected effectiveness, wherein the one or more marketing actions corresponding to the one or more pre-determined changes to the respective one or more marketing attributes associated with the at least one of the marketable items include one or more of: a change to inventory level associated with the at least one of the marketable items, or a change to an amount of advertising presented in relation to the at least one of the marketable item;

wherein the method further comprises:

determining for a particular segmented group from the one or more segmented data groups an average metric value, M, and a standard deviation value, S, for metric values associated with each of one or more data records in the particular segmented group;

determining a new average metric, M', according to M'=M+0.5S;

determining a new standard deviation value, S', based on the new average metric M' and the metric values associated with each of the one or more data records in the particular segmented group; and segmenting the particular segmented group into at least two new segmented groups based, at least in part, on a determination that number of data records in the particular segmented group whose metric value is within S' from the new average metric M' exceeds a pre-determined group size threshold.

35. The method of claim 1 wherein the marketable item comprises one or more of a product and a service.

36. The system of claim 12 wherein the marketable item comprises one or more of a product and a service.

37. The computer program product of claim 23 wherein the marketable item comprises one or more of a product and a service.

38. The method of claim 1, wherein the rule is one of multiple pre-determined rules and the corresponding pre-defined threshold is specified as a parameter of the rule, the pre-defined threshold specified in the rule being different from respective threshold values specified in at least one other of the multiple pre-determined rules.

* * * * *